Patented Oct. 11, 1949

2,484,216

UNITED STATES PATENT OFFICE 2,484,216

SYNTHETIC RESINS COMPRISING COPOLYMERS OF UNSATURATED METAL ESTERS WITH LIQUID POLYMERIZABLE MONOMERS

Newton C. Foster, Pittsburgh, Pa., assignor to Westinghouse Electric Corporation, East Pittsburgh, Pa., a corporation of Pennsylvania No Drawing. Application May 22, 1948, Serial No. 28,737

4 Claims. (Cl. 260—78.5)

This invention relates generally to synthetic resinous materials, and more particularly to copolymers of compounds having a reactive vinyl or vinylidene group with metal salts of alkyl half esters of unsaturated dicarboxylic acids.

It has been regarded as being desirable to prepare synthetic resins containing metal atoms. However, the manufacture and use of many metallo-organic resinous compositions has been limited by the relative insolubility in volatile solvents of the compositions in the uncured condition, which makes difficult the processing required to incorporate the resin into a laminate or other useful form.

The object of the invention is to provide a synthetic resinous material containing metal atoms which is readily soluble in common volatile organic solvents, by copolymerizing metallic salts of alkyl half esters of unsaturated dibasic acids with polymerizable liquid monomers having a reactive $CH_2=C<$ group.

Other objects of the invention will, in part, be obvious, and will, in part, appear hereinafter.

In practicing the invention, the metallo-organic reactant is prepared by reacting an alkyl half ester of an unsaturated dicarboxylic acid with a reactive metal salt such, for example, as an oxide of a polyvalent metal, to produce a metal salt of the acid ester.

As a specific example, 1 mole of mono-isopropyl maleate was mixed with ½ mole of zinc oxide, and the mixture was heated to 125° C. for about thirty minutes. An exothermic reaction occurred, resulting in a clear colorless compound having a heavy balsam-like consistency. The compound produced by this reaction, zinc isopropyl maleate, has the following structural formula:

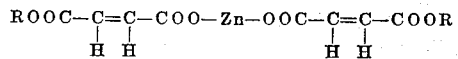

where R is the isopropyl radical.

Other metallo-organic compounds for practicing the invention may be prepared in a similar manner, having the same formula, with each R being the same or different alkyl radicals having between 2 and 10 carbon atoms. These other metallo-organic compounds can be reacted as hereinafter described, either alone or in admixture with one another. Hereafter zinc isopropyl maleate will be designated as typical of all of these compounds.

The zinc alkyl maleate is then reacted with a compound having the reactive group $CH_2=C<$ to produce the resinous copolymers of this invention.

Example I

|  | Moles |
|---|---|
| Zinc isopropyl maleate | 1 |
| Monostyrene | 4 |

0.62 gram of benzoyl peroxide and 30 grams of benzene per gram mole of zinc isopropyl maleate, were added to the above mixture. The solution was then refluxed at about 88° C. for 5 hours. At the end of this period, 135 cc. of ethyl alcohol was added to reduce the viscosity, and refluxing was continued for an additional 8 hours. The resulting resinous solution was utilized to impregnate sheets of alpha cellulose paper 5 mils thick. The impregnated sheets were dried for 5 minutes in an oven at 135° C. and a number of the sheets were then superimposed and laminated at 1500 p. s. i. at 175° C. for 20 minutes. The resulting laminate was translucent and very hard, and did not fuse when heated in an oven to 250° C.

Example II

|  | Moles |
|---|---|
| Zinc isopropyl maleate | 1 |
| Monostyrene | 8 |

The styrene had been previously washed with alkali and dried over calcium chloride. No catalyst or solvent was used. The above mixture was heated 48 hours on a water bath at 100° C. The resulting solid polymer was ground and freed of residual styrene by heating for 3 hours in an oven at 140° C. The resin was molded for 15 minutes at 175° C. and 1500 p. s. i. The molded piece was hard, but not brittle.

Example III

|  | Moles |
|---|---|
| Zinc isopropyl maleate | 1 |
| Monostyrene | 1 |

0.5% by weight of benzoyl peroxide was added to the above mixture, which was then heated 10 hours at 100° C. on a water bath. A clear, colorless solid resulted, which was ground and molded at 175° C. at a pressure of 1000 p. s. i. The molded piece was translucent and very hard.

The invention is not limited to the use of the specific compounds disclosed in the above examples. The alkyl acid half ester of maleic acid may be replaced, partially or entirely, by alkyl half esters of other unsaturated dicarboxylic acids such as fumaric, itaconic, citraconic or substituted maleic acids such as monochloromaleic acid. The alkyl group of the half esters of these acids may be any alkyl group having between 2 and 10 carbon atoms, such as the ethyl, propyl, butyl, amyl, etc., groups. The zinc oxide may be replaced by zinc chloride, zinc carbonate, basic zinc oxide, zinc bromide, and the like.

The monostyrene may be replaced partially or entirely by other liquid monomeric compounds having a reactive $CH_2=C<$ group, such as distyrene, vinyl acetate, paramethyl styrene, methyl vinyl ketone, acrylonitrile, methyl methacrylate, allyl acrylate and allyl esters, such as diallyl phthalate. Two or more unsaturated groups may be present in the monomer.

In making laminated members incorporating the resins of this invention, sheets of fibrous materials such as asbestos paper, asbestos cloth, glass cloth, cotton duck, and alpha cellulose paper may be impregnated with the resin, and subsequently superimposed and subjected to heat and pressure in suitable molds to form a member having a predetermined shape. The laminates so formed have been found to be exceptionally resistant to surface abrasion.

The resins made in accordance with this invention are particularly valuable in applications where resistance to organic solvents or to moisture is necessary. For example, tests on the desired resins of the above examples show that they have excellent resistance to the action of organic solvents such as benzene and acetone. After immersion in water for one month, the molded pieces were found to be entirely unaffected.

Although the present invention has been described with reference to certain specific embodiments, it is intended that all matter contained herein be interpreted in an illustrative rather than in a limiting sense.

I claim as my invention:

1. A resinous material comprising the reaction product derived by heating 1 mole of zinc isopropyl maleate with between 1 and 8 moles of styrene.

2. A resinous material comprising the reaction product derived by heating 1 mole of a zinc alkyl maleate, the alkyl groups having between 2 and 10 carbon atoms, with between 1 and 8 moles of styrene.

3. A resinous material comprising the reaction product derived by heating 1 mole of a zinc salt of an alkyl half ester of an unsaturated dicarboxylic acid, the alkyl groups having between 2 and 10 carbon atoms, with between 1 and 8 moles of a compound having the group $CH_2=C<$.

4. A resinous material comprising the reaction product derived by heating 1 mole of a compound having the unit formula

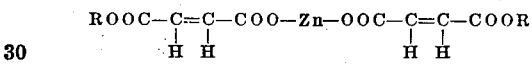

where R is an alkyl radical having between 2 and 10 carbon atoms, with between 1 and 8 moles of a compound having the group $CH_2=C<$.

NEWTON C. FOSTER.

No references cited.